H. A. OLSSON.
BOTTLE CAPPER.
APPLICATION FILED FEB. 3, 1909.

968,792.

Patented Aug. 30, 1910.
7 SHEETS—SHEET 1.

Witnesses:
G. G. Furs.
H. D. Penney

Inventor:
Henry A. Olsson,
By his Attorney, F. H. Richards.

H. A. OLSSON.
BOTTLE CAPPER.
APPLICATION FILED FEB. 3, 1909.

968,792.

Patented Aug. 30, 1910.
7 SHEETS—SHEET 6.

Witnesses:

Inventor:
Henry A. Olsson,
By his Attorney,

UNITED STATES PATENT OFFICE.

HENRY A. OLSSON, OF BROOKLYN, NEW YORK, ASSIGNOR TO MULTI-SEAL MANUFACTURING COMPANY, OF BROOKLYN, NEW YORK, A CORPORATION OF NEW YORK.

BOTTLE-CAPPER.

968,792.　　　　　Specification of Letters Patent.　　Patented Aug. 30, 1910.

Application filed February 3, 1909. Serial No. 475,756.

*To all whom it may concern:*

Be it known that I, HENRY A. OLSSON, a citizen of the United States, residing in Brooklyn, in the county of Kings and State of New York, have invented certain new and useful Improvements in Bottle-Cappers, of which the following is a specification.

This invention relates to machines for capping bottles and jars, and especially for sealing paper caps on the bottles or jars used for delivery of milk and cream to consumers.

One of the objects of the invention is to provide means whereby a set of bottles in a container, such as a dozen milk bottles in a shipping box, can have the box placed in the machine, and the caps will be sealed on the bottles all at one time, and preferably without removal of the bottles from the box.

A further object of the invention is to provide an improved means for placing the cap on the bottle end, pressing the same against the bottle below the enlarged mouth thereof, and at the same time cause a rotary or twisting movement on the cap to properly close the flutes in the side of the caps; and which means will hold the caps against the bottle neck while the same is immersed in a sealing fluid, yet will permit free access of the fluid to the cap.

In the accompanying drawings representing embodiments of my invention.

In an application recently filed by me Serial No. 467,898, mechanism is shown for successively subjecting bottles in an inverted position with a cap applied to a sealing fluid. In the present invention, the bottles do not have to be taken from the containing box and placed in the machine, and then removed therefrom; but a whole box or case of bottles is placed in the machine, and by the operation of the several parts thereof, the box of bottles is inverted, the bottles have the caps applied to their sealing end, and the caps and bottle ends are all immersed in a sealing fluid, and the caps pressed against the bottle neck; then the box is returned to its normal position and removed from the machine; the whole operation being performed without removal of bottles from the box. In the said application the pressing means for the caps on the bottle necks comprise essentially an annular member in which a segment was movable radially to and from the other members. In the present invention an annular member is provided that has a contracting movement throughout substantially all of its perimeter or bore, and which is also given a kind of rotary or twisting movement, that will facilitate the proper closing of a bottle cap having fluted sides all extending in one direction of rotation.

Figures 1, 17:
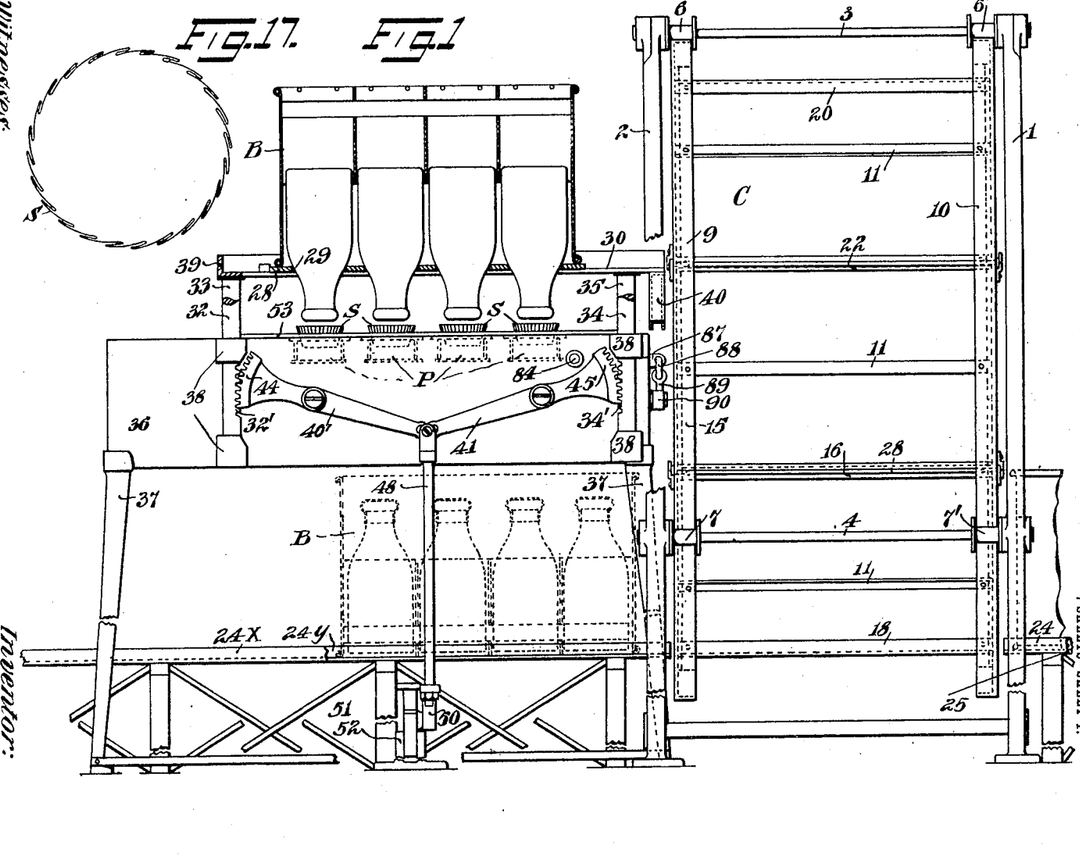
Figure 1 is a front elevation of the machine partly in section.
Fig. 17 shows a fluted cap.
Figure 2:
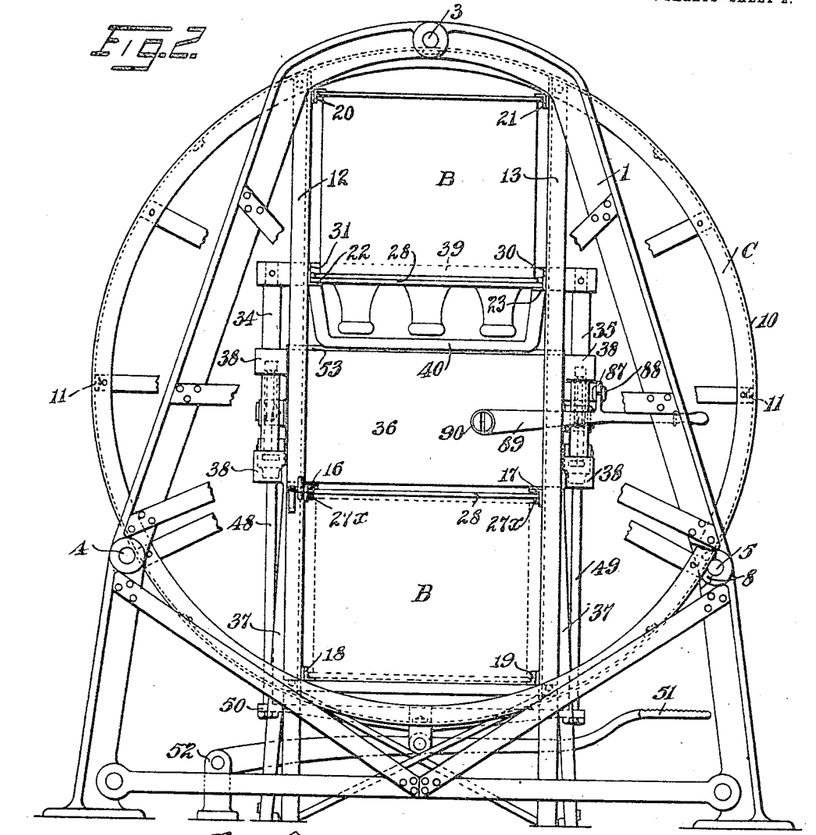
Fig. 2 is a side elevation.

The machine is shown as having two upright frames 1 and 2 between which extend shafts 3, 4 and 5 carrying guide rollers 6, 7 and 8, and 6', 7', and 8' respectively on opposite ends of the shafts. These rollers rotatably support a cage denoted generally by C comprising two rings 9 and 10 that are guided respectively in the said sets of rollers, and which rings are rigidly connected by cross bars 11. By means of the supporting rollers the ring member is freely rotatable in the frames. The cage has on one side a pair of parallel supporting bars 12 and 13, and a similar pair 14 and 15 located directly opposite on the other side. A guideway is provided extending perpendicular to these parallel bars, and may be formed by angle strips 16, 17, 18 and 19, forming a runway into the cage for a box B containing a dozen bottles. A runway in the frame is formed by bars 24, 25 that registers with the said guideway when in the lowermost position. The box of bottles is thereby slid from the stationary guideway into the said guideway in the cage. A number of these guideways may be provided in the cage to be brought successively to the said guideway 24, 25 where the box is introduced, and two are shown. Another guideway in the cage is formed by four bars 20, 21, 22 and 23 in a position diametrically opposite the said first guideway. Upon a box of bottles being slid into the cage from the said stationary guideway, and the cage turned a half revolution, the box of bottles will be inverted in the upper part of the frame, and to prevent the bottles falling down out of the box, a lid or plate 28 is attached to the top of the box, and contains a series of openings 29, one for each bottle, of a size to engage the breast of the bottle and prevent its falling entirely out of the box; but permitting the projection downward of the bottle neck, as indicated in Fig. 1. This lid slides on guides 27˟.

When the box of bottles is in the uppermost and inverted position, it is pushed out at one side of the cage, by sliding upon two guiding bars 30 and 31 carried by posts 32, 33, 34 and 35, that are supported on a dipping tank 36. This tank may be carried by standard 37 from the base of the machine.
The said four posts are not secured rigidly to the tank, but slide in journals 38 on the outer sides of the tank, whereby the posts can be given a vertical movement to carry the guide frame formed by the two guide bars 30 and 31 up and down. These guide bars are connected at one end by a cross bar 39, and at the other ends by a cross bar 40 that is bent downward to permit the sliding movement of the bottles with the necks projecting downward, as indicated in Fig. 1. The said four posts are provided on their inner faces with rack portions 32′, 33′, 34′ and 35′ that are engaged respectively by four levers 40′, 41, 42 and 43 having toothed segments 44, 45, 46 and 47 on their extremities. The adjacent ends of levers 40′ and 41 are pivoted to a rod 48 and the adjacent ends of the levers 42 and 43 are pivoted to a rod 49. These rods at their lower ends are connected by a bar 50 that pivotally connects with a foot lever 51 extending to the front of the machine, and pivoted on a bracket 52 at its rear end. The depression of this foot lever will swing the four segment levers to elevate the guide frame for the box, and the weight of the box and frame will cause its downward movement when this foot lever is released; which movement will carry the projecting necks of the bottles down into the tank 36.

Figures 10, 11:
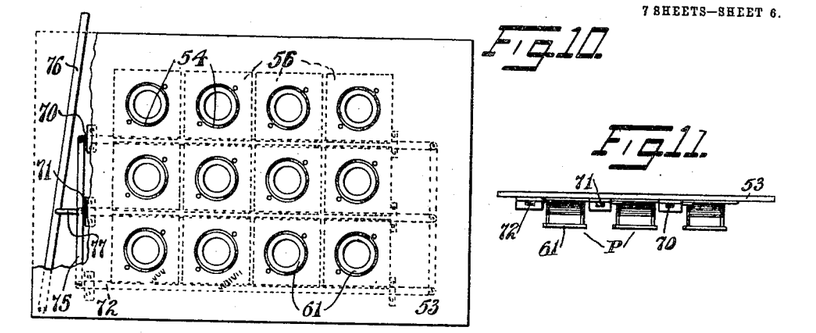
Fig. 10 is a plan view of the top plate for the dipping tank.
Fig. 11 is an end view of the said plate.

The tank 36 contains a sealing fluid, that is preferably paraffin or the like, melted by suitable heating means, such as a pipe 36′ for containing steam or hot water. The tank 36 has a top member or plate 53 containing a number of openings 54 for admission of the bottle necks. On the lower side of this plate at each opening for the bottle neck is carried a pressing or gripping means for receiving a bottle cap, shown in Fig. 17, and is adapted to press the cap against the bottle neck beyond the bead of the mouth. These pressing means, denoted generally by P, are shown in Fig. 11, and in detail enlarged in Figs. 12–16. They are identical and each is shown as comprising a frame member, formed by a ring 55 rotatably mounted on the lower side of the plate adjacent the opening 54 by means of a rabbeted ring 56. The ring 55 has opposite ears 57 and 58 carrying posts 59 and 60. The lower ends of these posts carry a supporting ring 61; the frame being thus formed of two rings connected by two posts. On the plate 53 on opposite sides of the opening 54 are posts 62 and 63. Between each of the frame posts and one of the said posts on the plate or lid of the tank is extended one or more flexible bands, that are preferably resilient, and each of the bands is somewhat in the form of a horse-shoe, whereby a substantially circular space is inclosed practically registering with the opening 54 in the lid plate, and in the ring frame. Between the posts 62 on the lid plate and the post 60 are extended three resilient bands 64, 65 and 66. And between the post 63 on the lid plate and the post 59 on the ring frame extend three resilient bands 67, 68 and 69. In their normal position these bands inclose an annular space larger than the bottle neck or mouth, and which registers with the opening 54 in the lid. But when the ring frame is rotated, one end of each band is shifted toward the other end to bring the bands together and therefore to reduce the diameter of the inclosed space. If a bottle cap is put down through the opening 54 in the ring frame and a bottle inserted, the swinging of the frame will cause the bands to engage the bottle cap beyond the beaded neck of the bottle and will press the paper cap against the bottle neck, by a rotative or twisting movement. And this is of especial advantage in smoothly closing the single plaits of the cap.

Figures 12, 13, 14, 15, 16:
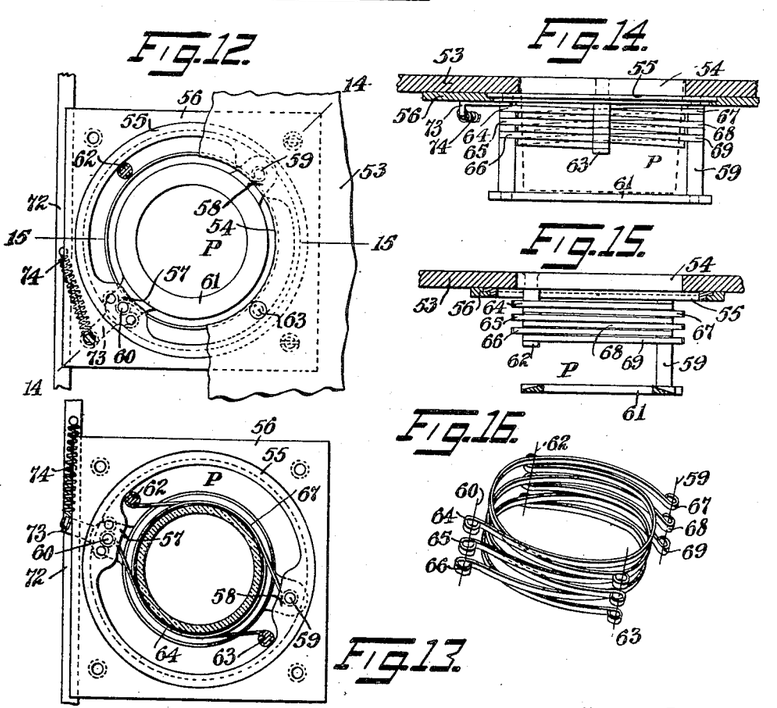
Fig. 12 is a plan view partly broken away of the cap applying device.
Fig. 13 is a plan view of the same representing a cap compressed on the neck of a bottle, that is shown in section.
Fig. 14 is a section on the line 14—14 of Fig. 12.
Fig. 15 is a section on the line 15—15 of Fig. 12.
Fig. 16 shows in perspective the pressing bands for the cap applying device.
Figures 18, 19, 20:
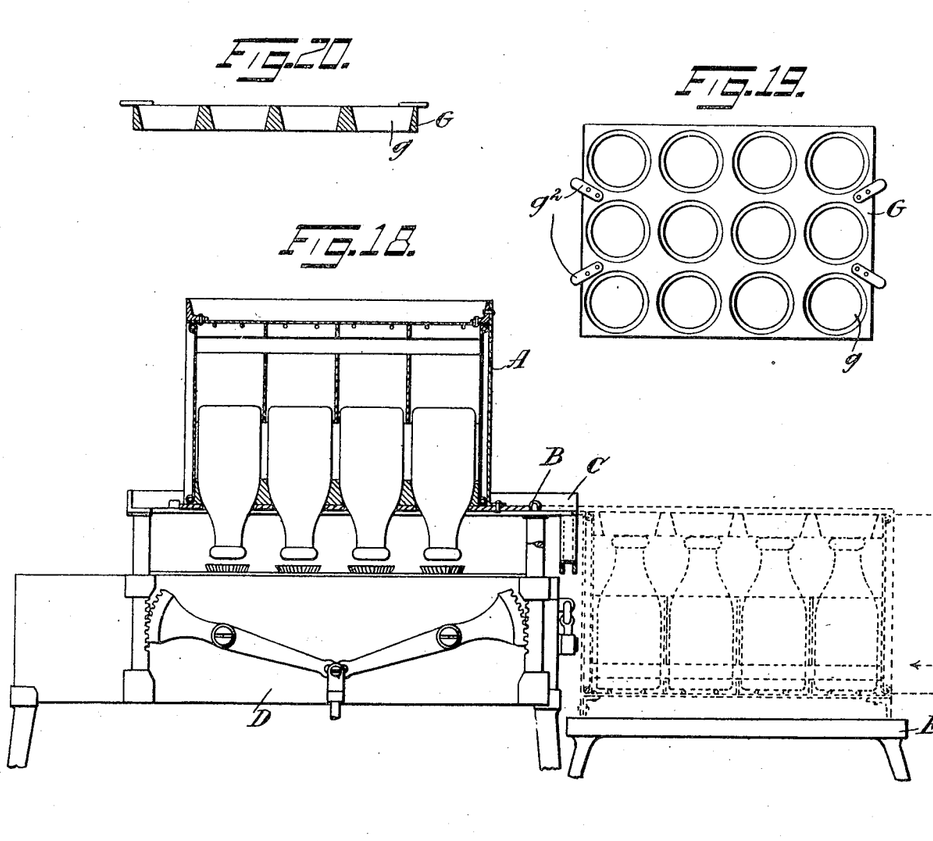
Fig. 18 shows a modification of the machine shown in Fig. 1.
Fig. 19 shows the guide plate for the lid.
Fig. 20 shows a section of the latter.

It will be observed from Figs. 14 and 15 that the series of bands are adjacent the lid plate 53 and spaced some distance from the bottom ring 61 of the ring frame. By 125 reason of the narrow bands the bottle cap will not be shielded from access to the sealing fluid. Furthermore when the bands are released and move away from the bottle cap after immersion, they will not tend to draw 130 the cap away from the bottle neck because of their comparatively small area. There is one of these said pressing devices P for each of the twelve openings in the lid plate 53, and the ring frames are all connected to a lever to open and close in unison. Three parallel bars 70, 71, and 72 are guided to reciprocate adjacent the bottles, and each ring frame carries an arm 73 connected with an adjacent one of said bars by a spring 74. The bars are connected by cross bar 75, that is connected with a lever 76 by a link 77. On swinging this lever the ring frames will simultaneously open and close.

Figure 6:
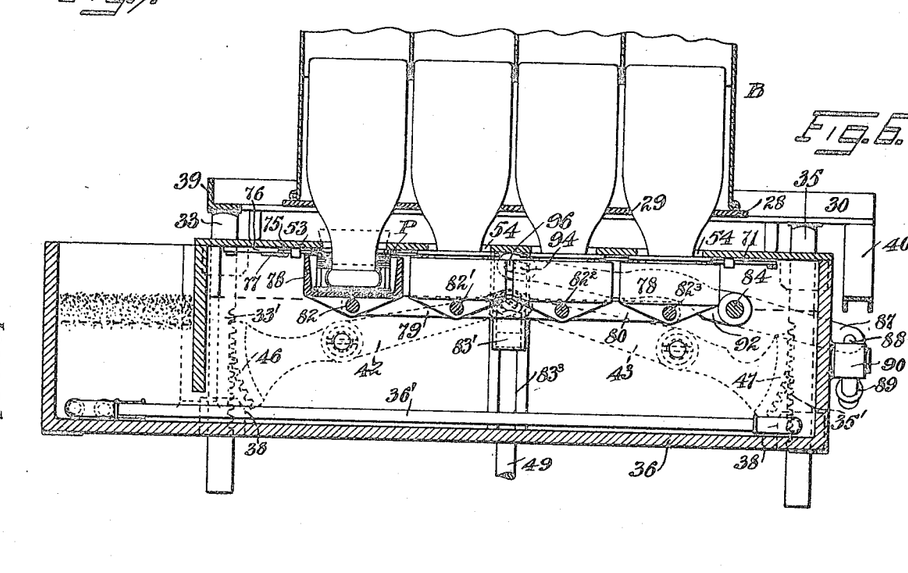
Fig. 6 is a vertical section enlarged through the dipping tank and box slide.
Figure 7:
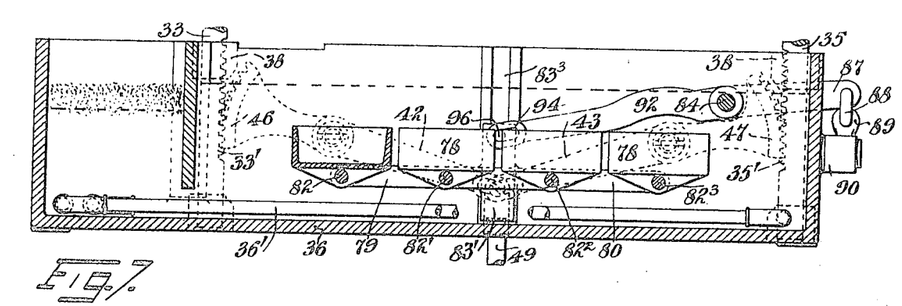
Fig. 7 is a similar view of the tank with the parts in other positions.

Instead of bringing the necks of the inverted bottles down into the melted paraffin in the tank, conveying means such as a number of cups 78 are provided, one for each bottle, and these cups are movably supported below each of the ring frames that engage the bottle caps. A frame work 79 composed of side bars 80 and 81 and transverse bars 82, 82', 82'' and $82^3$ supports the twelve cups 78 and is connected to slides 83 and 83' on each side of the tank and which slide in guides $83^2$ and $83^3$. A shaft 84 is carried in bearings 85 and 86 in the sides of the tank, and has an arm 87 connected by link 88 with a lever 89 pivoted at 90 to the tank. Arms 91 and 92 are secured to opposite ends of the shaft 84, and slots 93 and 94 in the ends of the arms respectively engage pins 95 and 96 on the slides 83 and 83' respectively. On swinging the lever 89 the frame and cups will be elevated from a position immersed in the tank to a position in which the capped end of the bottle is immersed in the cup as shown in Fig. 6.

Figures 8, 9:
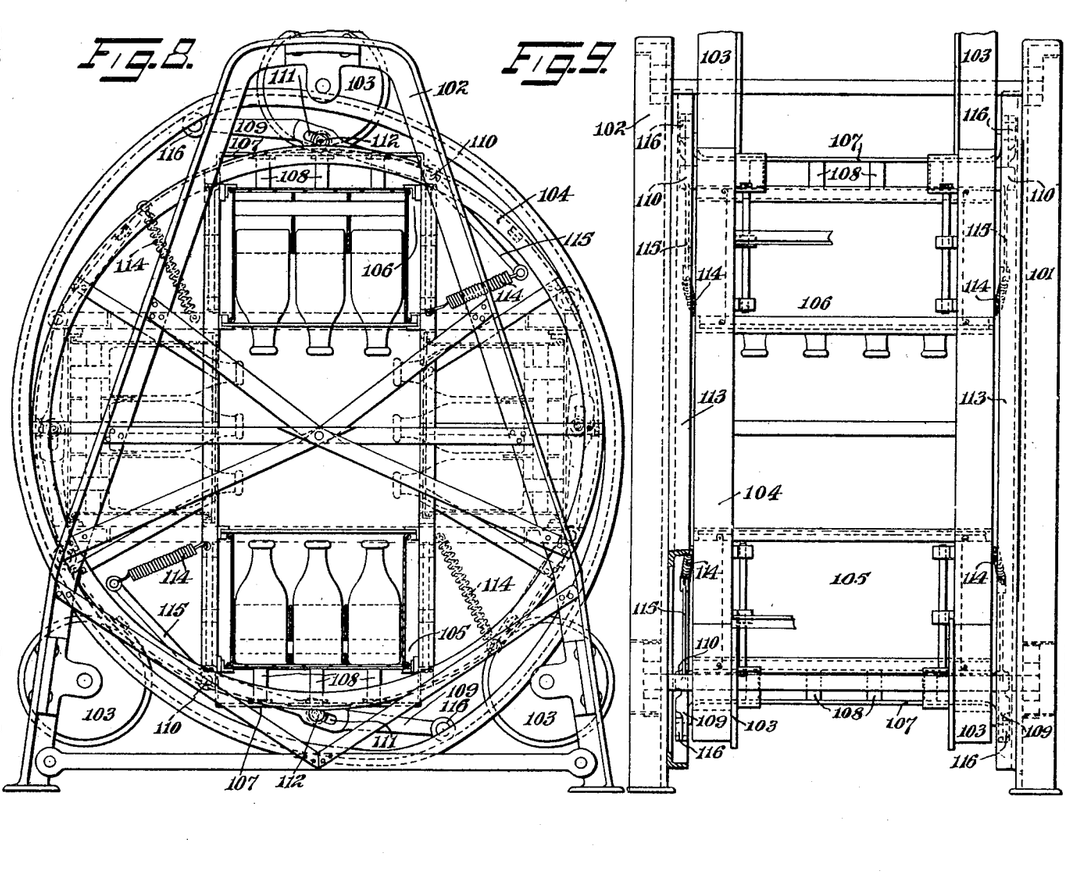
Fig. 8 shows in side elevation a modified form of the machine.
Fig. 9 is an end elevation of the machine shown in Fig. 8.

In the construction that has been described herein, as the cage swings around the bottles become inverted, and they will fall a short distance until the breast of the bottle strikes the opening 29 in the lid 28. To prevent a rapid falling of the bottles, means are provided for advancing the bottles into the openings before they become inverted, and such means are shown in Figs. 8 and 9 as comprising a suitable frame work having opposite side members 101 and 102 each carrying rollers 103 in which rotates a ring frame denoted generally by 104, substantially similar to that just described; having guideways for the boxes at opposite portions denoted generally by 105 and 106. The box for the bottles is supposed to have a skeleton bottom, and a frame 107 is slidable in the bottom and carries twelve pins 108 arranged to engage each of the twelve bottles as the cage rotates and advance them to engage the apertured lid. These frames are advanced by levers 109 pivoted to the cage 110 and having a slot 111 engaging a roller 112 in the frame for the pins. As this lever is rocked the frame will rise and shift the bottles. The lever 109 has a roller 116 on its free end that engages an eccentric track 113. This track is so shaped relative to the orbit of the cage that as the box of bottles swings from the lowermost to the intermediate or horizontal position, the pins will advance and shift the bottles until they engage the apertured plate by the time they reach the horizontal position. Then this eccentric track changes its course, the lever is withdrawn by a coil spring 114 on the extremity 115 of the lever, and the pins are withdrawn from the box permitting the box to be shifted out of the cage over to the dipping tank. When the box of bottles has been capped and is returned to the cage, as the cage commences to rotate to the horizontal position, the pins are returned to engage the bottoms of the bottles as indicated in the left side in Fig. 8. And the continued movement of the box in the cage will cause these pins to be gradually withdrawn as the box assumes its normal position, and the bottles will gradually fall by gravity back into the box during this regular withdrawal of the frame and pins.

Figures 3, 4:
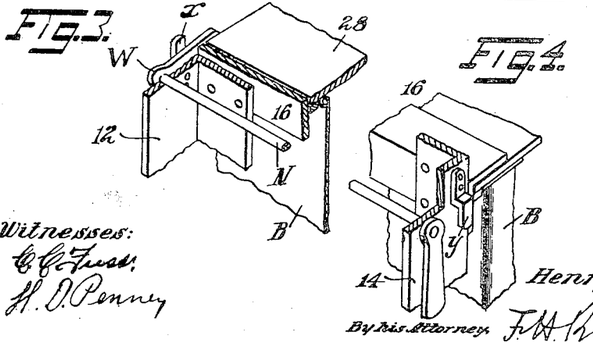
Figs. 3 and 4 show details of a stop for the box.
Figure 5:
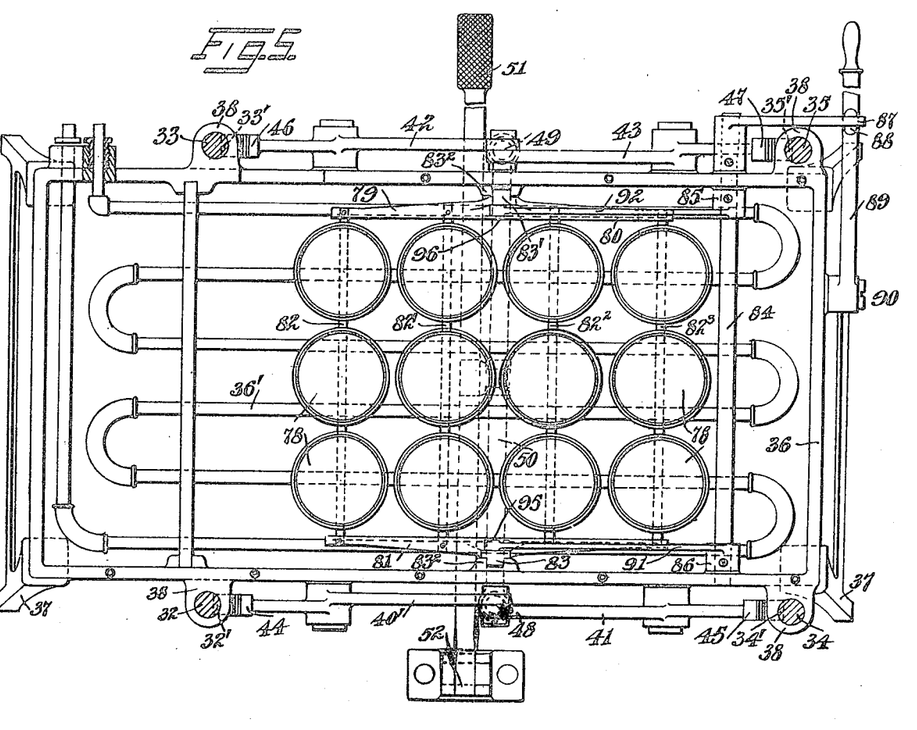
Fig. 5 is a section above the grippers of Fig. 1.

The operation of the machine is substantially as follows: The box of bottles is placed on the slides 24, 25 and the cage is turned to bring one of the two guideways to register therewith, and the box is slid into the cage until it strikes a stop arm W on a shaft N in the cage shown only in Figs. 3 and 4. Then the cage is swung a half revolution to invert the box and bottles, and the latter will fall until their breast portion engages the opening in the box lid 29. This lid 29 may be provided with a guide plate G having conical openings $g$, that will serve to guide the bottles as they fall when inverted. This plate has lugs $g^2$ that may engage the sides of the box. In this position, the inverted box registers with the frame bars 30, 31 and the box is slid out of the cage onto this frame, to the position indicated in Fig. 1. The connecting bar 50 is elevated and the pressing or gripping means depressed to permit free passage of the depending bottle necks. It should be stated that the lever 51 is previously depressed to elevate the frame bars 30, 31 to this position. But before the box has been advanced to this position, the plaited bottle caps S are placed in the openings in the lid 53 of the tank 36. The paraffin in the tank has been heated to render it perfectly fluid and the frame carrying the cups is immersed in the tank to fill the cups with the paraffin and to also heat them to the same temperature. The first operation is to permit the treadle to rise and the frame carrying the bottles will be lowered and the bottles will pass into the caps and force them down through the openings into the ring frame members, as indicated in Fig. 6, with the top of the bottle mouth engaging the bottom plate of the ring frame. Next, the lever 89 is swung to elevate the cups to the top of the tank, and each cup will then have a ring frame P containing the bottle cap and the bottle mouth therein, as shown in Fig. 6. The cup being filled with paraffin as it is elevated, the immersion therein of the ring frame with the bottle and cap will of course, cause some of the paraffin to overflow back into the tank. The ring frame has not yet been compressed but the cap is somewhat open; and now the lever 76 is swung to compress all of the spring members of the frames and these will close on the fluted caps and press them against the bottle neck below the bead on the end of the bottle. Previous to the closing of the spring members of the ring frame, the entire outer surface of the bottle caps would be subjected to the melted paraffin and become coated or saturated therewith. Hence the closing of the caps on the bottle necks will bring together the saturated flutes or plaits in the cap and will press the same against the bottle neck. And this movement being a rotary one, the caps will be given the kind of twisting movement that will fold the plaits all in the same direction and they will closely fit each other and the bottle neck. The cap being saturated with paraffin at its side, the paraffin will soak through the paper of the cap and when pressed against the bottle neck will adhere thereto. Thereupon the lever 89 is swung to lower the cups 78 free from the bottles and ring frame, and back into the tank, whereby the cups will become refilled with paraffin, and their temperature will be elevated to that of the paraffin. As soon as the cups are lowered the paraffin on the fluted caps now pressed against the bottle neck by the ring frame members will begin to harden and set, and it is engaged only at a small portion of its surface by the spring bands. Then the lever 76 is swung back to open the spring frames that will release the bottle caps and will open sufficiently to permit the free exit of the bottle mouths, whereupon the frame 30, 31, is elevated by depressing the treadle. The fluted caps will be fixed on the bottle necks by the hardening of the paraffin. The box of bottles can now be slid back into the cage. But at this time or before at any time after the cage has been given its half revolution another box of bottles is slid from the guideway 24, 25 into the other guideway in the cage that will now register therewith. Therefore when the box of bottles has been capped and returned to the cage, the cage is given another half revolution that will bring the box of capped bottles down to the lower position, and will swing a fresh box of bottles to the uppermost position to be therefrom advanced and go through the capping operation as just described.

If desired the box of capped bottles may be slid out of the cage from the guideway in the lower position, into a special guideway formed by the guide bars $24^x$ and $24^y$ located beneath the tank and in alinement with the receiving guideway 24—25.

It should have been stated that when the cage is revolved to bring the box of bottles to the upper position the shaft N is swung to bring the arm W away from the box from its cleat $w$ and to bring the arm $z$ on shaft N in the path of the box in order to engage the box when it is returned to the cage after the capping operation; in which position the arm $z$ will strike the lug $y$.

By this construction it will be seen that an entire box or case of bottles, containing a dozen or more are passed through the capping operation and all capped at one time, and that without being removed from the box, and further that the operation is practically continuous, as one box is advanced into the cage, the box of capped bottles is moved out of the device.

Having thus described my invention, I claim:

1. The combination of a frame work, a box supporting member movable on the frame work to invert a box of bottles placed therein, a tank for sealing fluid carried by the frame work, a support carrying a plurality of cups, cap applying means for pressing a cap on an inverted bottle, and means for lowering the cups into the tank and raising them out of the tank to immerse the caps on the inverted bottles in the cups.

2. The combination of a frame work, a box supporting member movable on the frame work to invert a box of bottles placed therein, a tank for sealing fluid carried by the frame work, a support carrying a plurality of cups, means for lowering the cups into the tank and raising them out of the tank, and cap-applying means for pressing a cap onto the neck of the bottles when in the inverted position.

3. The combination of a frame work, a box supporting member rotatable on the frame work to invert a box of bottles placed therein, a tank for sealing fluid carried by the frame work, a support carrying a plurality of cups, cap applying means for pressing a cap on an inverted bottle, and means for lowering the cups into the tank and raising them out of the tank to immerse the caps on the inverted bottles in the cups.

4. The combination of a frame work, a box supporting member movable on the frame work to invert a box of bottles placed therein, a tank for sealing fluid carried by the frame work, a support carrying a plurality of cups, means for lowering the cups into the tank and raising them out of the tank, cap-applying means for pressing a cap on an inverted bottle, and means for lowering and raising a plurality of bottles and caps into and out of said cups.

5. The combination of a frame work, a supporting member movable on the frame work to invert a box of bottles placed therein, a tank for sealing fluid carried by the frame work, a support carrying a plurality of cups, means for lowering the cups into the tank and raising them out of the tank, the tank having a lid containing openings one for each bottle in the box, and cap applying devices carried by the lid below each of said openings, each of said devices being received by one of said cups when the cups are elevated to apply sealing fluid to the bottle cap.

6. The combination of a frame work, a supporting member movable on the frame work to invert a box of bottles placed therein, a tank for sealing fluid carried by the frame work, a support carrying a plurality of cups, means for lowering the support and cups into the tank and raising them out of the tank, the tank having a lid containing openings one for each bottle in the box, cap applying devices carried by the lid below each of said openings, each of said devices being received by one of said cups when elevated to apply sealing fluid to the bottle cap, and means for simultaneously operating all of said cap applying devices to press the caps onto the bottle necks.

7. The combination of a frame work, a cage rotatably supported in the frame work, a guideway in the cage extending longitudinally, a guideway at one side of the cage to receive a box of bottles from said guideway in the cage when the cage is swung to invert the box, a tank arranged below the latter guideway, a support carrying a plurality of cups spaced to engage the bottles in the box in the latter guideway, cap applying means for pressing a cap on an inverted bottle, and means for elevating and lowering the cups into and out of the tank to engage caps on the ends of the inverted bottles in the box in the guideway.

8. The combination of a frame work, a cage rotatably supported in the frame work, a guideway in the cage extending longitudinally, a guideway at one side of the cage to receive a box of bottles from said guideway in the cage when the cage is swung to invert the box, a tank arranged below the latter guideway, a support carrying a plurality of cups spaced to engage the bottles in the box in the guideway, means for elevating and lowering the cups into and out of the tank to engage caps on the ends of the inverted bottles in the box in the guideway, cap applying means for pressing a cap on an inverted bottle, and means for lowering and elevating said guideway located above the tank.

9. The combination of a frame work, a cage rotatably supported in the frame work, a guideway in the cage extending longitudinally, a guideway at one side of the cage to receive a box of bottles from said guideway in the cage when the cage is swung to invert the box, a tank arranged below the latter guideway, a support carrying a plurality of cups spaced to engage the bottles in the box in the latter guideway, means for elevating and lowering the cups into and out of the tank to engage caps on the ends of the inverted bottles in the box in the guideway, a guideway on the frame work opposite the cage guideway in its lowermost position for guiding a box of bottles into the cage guideway, cap applying means for pressing a cap on an inverted bottle, and a guideway for a box of bottles in the frame on the opposite side of the frame for receiving a box of capped bottles from the cage.

10. The combination of a frame work, a cage rotatably supported in the frame work, a guideway in the cage extending parallel with its axis, a guideway at one side of the cage to receive a box of bottles from said guideway in the cage when the cage is swung to invert the box, a tank arranged below the latter guideway, a support carrying a plurality of cups spaced to engage the bottles in the box in the guideway, and means for elevating and lowering the cups into and out of the tank to engage caps on the ends of the inverted bottles in the box in the guideway, means for lowering and elevating said guideway above the tank, the tank having a lid containing openings one for each bottle in the box on the guideway, bottle-cap applying devices carried by the lid below each of said openings, each of said devices being engaged by one of said cups when elevated to apply sealing fluid to the bottle cap, and means for simultaneously operating all of said cap applying devices.

11. The combination of a frame work, a box supporting member movable on the frame work to invert a box of bottles placed therein, a lid member having openings for the bottles to engage their intermediate portions, and means for automatically advancing the bottles into such openings during the first part of the movement to invert the bottles.

12. The combination of a frame work, a box supporting member movable on the frame work to invert a box of bottles placed therein, a lid member having openings for the bottles to engage their intermediate portions, means for automatically advancing the bottles into such openings during the first part of the movement to invert the bottles, and means for retracting said advancing means at the latter part of said inverting movement.

13. The combination of a frame work, a box supporting member movable on the frame work to invert a box of bottles placed therein, a lid member having openings for the bottles to engage their intermediate portions, and means for automatically advancing the bottles into such openings during the first part of the movement to invert the bottles, and means for retracting said advancing means at the latter part of said inverting movement, said advancing means being arranged to engage the bottles during the reversing of the advancing movement to control the movement of the bottles back into the box.

14. The combination of a frame work, a cage rotatably supported in the frame work, a guideway in the cage extending horizontally to receive a box of bottles, a lid member for the box of bottles having openings for engaging each bottle to permit a partial movement of the bottles out of the box, means for advancing the bottles into the lid opening, as the cage swings to bring the bottles to a horizontal position.

15. The combination of a frame work, a cage rotatably supported in the frame work, a guideway in the cage extending horizontally to receive a box of bottles, a lid member for the box of bottles having openings for engaging each bottle to permit a partial movement of the bottles out of the box, means for advancing the bottles into the lid openings, as the cage swings to bring the bottles to a horizontal position, said means being automatically withdrawn as the bottles become inverted in the movement of the box.

16. The combination of a frame work, a cage rotatably supported in the frame work, a guideway in the cage extending horizontally to receive a box of bottles, a lid member for the box of bottles having openings for engaging each bottle to permit a partial movement of the bottles out of the box, means for advancing the bottles into the lid opening, as the cage swings to bring the bottles to a horizontal position, said means being automatically withdrawn as the bottles become inverted in the movement of the cage, and means for engaging the bottles on the return movement of the cage to reinvert the bottles to support the bottles during their return into the box.

17. In a machine for capping bottles, the combination of a frame, means on the frame for applying sealing fluid simultaneously to the side portions of caps on a set of bottles, means on the frame for pressing each of the caps on the sides of the bottles, and means carried by the frame for causing the simultaneous operation of the said pressing means.

18. In a machine for capping bottles, the combination of a frame, means on the frame for supporting a set of bottles, means on the frame for simultaneously applying sealing fluid to caps on the sides of the supported set of bottles, means on the frame for pressing each of the caps on the sides of the bottles on the supporting means, and means carried by the frame for causing the simultaneous operation of the pressing means.

19. In a machine for capping bottles, the combination of a frame, a plurality of cap applying means organized to simultaneously press caps on a set of bottles, a tank for sealing fluid on the frame, a conveying device, and means supporting the conveying device movable to shift it from a position immersed in the tank to a position in which bottles in the pressing means will be immersed in the device.

20. In a machine for capping bottles, the combination of a frame, cap applying means on the frame organized to simultaneously press caps on a set of bottles, a tank for sealing fluid on the frame, a set of cups corresponding to the pressing members, and means supporting the cups movable to shift the cups simultaneously from a position immersed in the tank to a position in which the pressing means are immersed respectively in the cups.

21. In a machine for capping bottles, the combination of a frame, means on the frame for supporting a set of bottles in inverted positions, cap applying means on the frame arranged to simultaneously press caps on the bottles respectively in the supporting means, means carried by the frame for simultaneously operating the pressing means, a tank supported on the frame, a set of cups corresponding to the pressing means, and means for supporting the cups movable to shift the cups from a position immersed in the tank to a position in which the bottles in the supporting and pressing means will be immersed in the cups respectively.

22. In a machine for capping bottles, the combination of a frame, cap applying means on the frame organized to simultaneously press caps on a set of bottles, a tank for sealing fluid on the frame, a set of cups corresponding to the pressing members, means supporting the cups movable to shift the cups simultaneously from a position immersed in the tank to a position in which the pressing means are immersed respectively in the cups, and means for simultaneously lowering and simultaneously raising the bottles into and out of the supporting and pressing means.

23. In a machine for capping bottles, the combination of a frame, means on the frame for supporting a set of bottles in inverted positions, cap applying means on the frame arranged to simultaneously press caps on the bottles respectively in the supporting means, means carried by the frame for simultaneously operating the pressing means, a tank supported on the frame, a set of cups corresponding to the pressing means, means for supporting the cups movable to shift the cups from a position immersed in the tank to a position in which the bottles in the supporting and pressing means will be immersed in the cups respectively, and means for simultaneously lowering and simultaneously raising the bottles into and out of the supporting and pressing means.

HENRY A. OLSSON.

Witnesses:
WILLIAM H. REID,
FRED. J. DOLE.